United States Patent [19]
Boekhorst et al.

[11] 3,748,531
[45] July 24, 1973

[54] CIRCUIT ARRANGEMENT FOR GENERATING IN A PICTURE DISPLAY DEVICE A SAWTOOTH CURRENT OF LINE FREQUENCY HAVING AN AMPLITUDE VARYING AT FIELD FREQUENCY

[75] Inventors: Antonius Boekhorst; Jan Joost Rietveld, both of Emmasingel, Eindhoven, Netherlands

[73] Assignee: W.S. Philips Corporation, New York, N.Y.

[22] Filed: May 27, 1970

[21] Appl. No.: 40,873

[30] Foreign Application Priority Data

May 29, 1969 Netherlands ....................... 6908228

[52] U.S. Cl. ........................................... 315/27 GD
[51] Int. Cl. ........................................... H01j 29/70
[58] Field of Search .................... 315/27 GD, 24, 26

[56] References Cited

UNITED STATES PATENTS

| | | | |
|---|---|---|---|
| 3,517,252 | 6/1970 | Williams | 315/24 |
| 3,571,653 | 3/1971 | Hansen et al. | 315/27 GD |
| 3,444,422 | 5/1969 | Wolber | 315/24 |
| 3,401,300 | 9/1968 | Dichler | 315/24 |
| 3,479,554 | 11/1969 | Kramer | 315/24 |

*Primary Examiner*—Carl D. Quarforth
*Assistant Examiner*—J. M. Potenza
*Attorney*—Frank R. Trifari

[57] ABSTRACT

A circuit arrangement for generating by means of a modulator in a colour picture display device a sawtooth correction current of line frequency flowing through the line deflection coils and having an amplitude varying at field frequency for the purpose of obtaining a better colour superposition in the corners of the screen of the display tube, comprising means to add an additional correction current which flows in the same direction as the first mentioned current and which is proportional to the third power of both the line and the field deflection currents. Said means may be a saturable coil or a resonant circuit which is tuned to a frequency which lies between the like frequency and twice the value thereof. In the latter case the voltage present across the circuit may be used for correcting the North-South pincushion distortion. Also, the modulator is controlled by an amplifier comprising a linear and a voltage-dependent resistor which ensure that a third-power component is added also to said field deflection current.

11 Claims, 21 Drawing Figures

Figure 1:
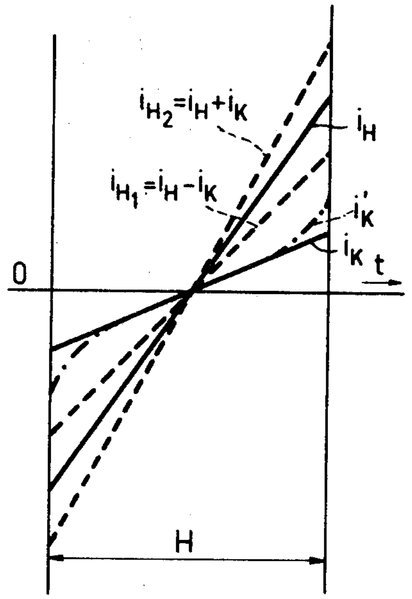

INVENTORS
ANTONIUS BOEKHORST
JAN J. RIETVELD
BY
AGENT

INVENTORS
ANTONIUS BOEKHORST
JAN J. RIETVELD
BY
AGENT

INVENTORS
ANTONIUS BOEKHORST
JAN J. RIETVELD
BY

AGENT

INVENTORS
ANTONIUS BOEKHORST
JAN J. RIETVELD
BY
AGENT

INVENTORS
ANTONIUS BOEKHORST
JAN J. RIETVELD
BY

AGENT

INVENTORS
ANTONIUS BOEKHORST
JAN J. RIETVELD
BY

AGENT

INVENTORS
ANTONIUS BOEKHORST
JAN J. RIETVELD
BY

AGENT

INVENTORS
ANTONIUS BOEKHORST
JAN J. RIETVELD
BY

AGENT

CIRCUIT ARRANGEMENT FOR GENERATING IN A PICTURE DISPLAY DEVICE A SAWTOOTH CURRENT OF LINE FREQUENCY HAVING AN AMPLITUDE VARYING AT FIELD FREQUENCY

The invention relates to a circuit arrangement for generating in a picture display device a sawtooth correction current of line frequency having an amplitude varying at field frequency, the picture display device being provided with a line and a field deflection current generator for applying a sawtooth current of line and field frequency to a line and a field deflection coil at a substantially constant peak-to-peak amplitude, and a modulator controlled by the field deflection generator for obtaining the amplitude variation of field frequency of the sawtooth correction current of line frequency, said sawtooth correction current of line frequency being proportional to the instantaneous value of the line deflection current and of the field deflection current.

U.S. Pat. No. 3,440,483 described a display device for colour television wherein for the purpose of correction on the screen of a display tube in the device use is made of a sawtooth correction current of line frequency having an amplitude varying at field frequency. From the beginning up to the end of the scan of a field period this correction current of line frequency is to decrease down to zero from a given value in a substantially linear manner, whereafter a substantially equal increase in the reverse current direction follows. This correction current is superimposed on the deflection current flowing in the line and/or field deflection coil, the peak-to-peak amplitude of the deflection current being substantially constant. Since the deflection coil is divided into two coil halves provided substantially symmetrically on either side of the neck of the display tube, it is possible to add the correction current in one coil half to the deflection current and to subtract it from the deflection current in the other coil half. The magnetic deflection field of one coil half will therefore be enlarged and that of the other coil half will be reduced to a substantially equal extent.

As has been described in the said U.S. patent the so-called anisotropic astigmatism of a deflection coil causes a distortion which gives an electron beam having a circular or ellipse cross-section a tilted ellipse shape, which distortion is dependent on the extent of the deflection. In other words, this distortion occurs most seriously in the corners of the displayed picture and it results in colour superposition errors. The said patent application shows that it is possible to eliminate this distortion with the aid of an oppositely directed distortion caused by the above-mentioned correction current.

The said amplitude variation of field frequency of the sawtooth current of line frequency is established by means of a modulator controlled by the field deflection current generator. The said patent application describes inter alia an arrangement wherein this modulator is formed as a multiplier to which information regarding the line and field deflection currents is supplied. If the centre horizontal line on the screen of the display tube is referred to as $x'Ox$ and the central vertical line is referred to as $y'Oy$, wherein $O$ is the centre of the screen while, as is common practice in mathematics, $x'Ox$ extends from left to right $y'Oy$ extends from bottom to top, it can be assumed that the compensating deviation $\Delta x$ which is established by means of the modulator is in the first instance proportional to $x$ and to $y$. In this case $x$ and $y$ are the coordinates of one point on the screen relative to the previously defined system of coordinates. In this manner the compensating deviation $\Delta x$ is indeed increased in the corners of the screen and is zero on the axes $x'Ox$ and $y'Oy$.

However, the invention is based on the recognition of the fact that the previously described correction is not sufficient to completely eliminate the colour superposition errors in the corners of the screen of the display tube. In order to be able to eliminate this the circuit arrangement according to the invention is characterized in that it includes means to add an additional correction current to the sawtooth current in the vicinity of the beginning and the end of each scan period, which additional current flows in the same direction as the said correction current and which is proportional to the third power of the line deflection current and to the third power of the field deflection current.

The correction currents may be produced in different manners. To this end the circuit arrangement according to the invention is further characterized in that the means for producing the additional correction current during the line scan period are obtained by means of a coil which is series-arranged with the modulator and whose inductance decreases when the current flowing therethrough increases and that the means for producing the additional correction current during the line scan period are obtained by means of a parallel circuit which is series-arranged with the modulator and whose resonant frequency lies between the line frequency and twice the value thereof.

Furthermore the invention is based on the recognition of the fact that the voltage which is present under these circumstances across the said parallel circuit may alternatively be used for other purposes. To this end, the circuit arrangement according to the invention is characterized in that the coil in the parallel circuit constitutes the primary winding of a transformer and that the voltage produced across the secondary winding of the transformer controls a circuit for the correction of the North-South pincushion distortion on the screen of a picture display tube present in the picture display device.

In order that the invention may be readily carried into effect, a few embodiments thereof will now be described in detail, by way of example, with reference to the accompanying diagrammatic drawings, in which:

FIGS. 1 and 2*a*, 2*b*, and 2*c* show a few current waveforms which are to be produced by the circuit arrangement according to the invention.

Figure 3:
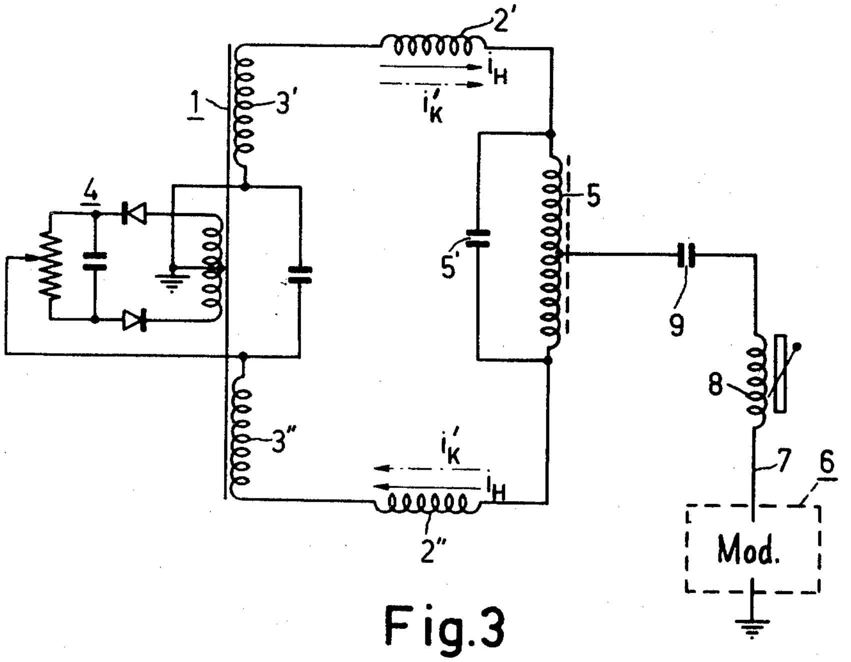
Figure 4A:
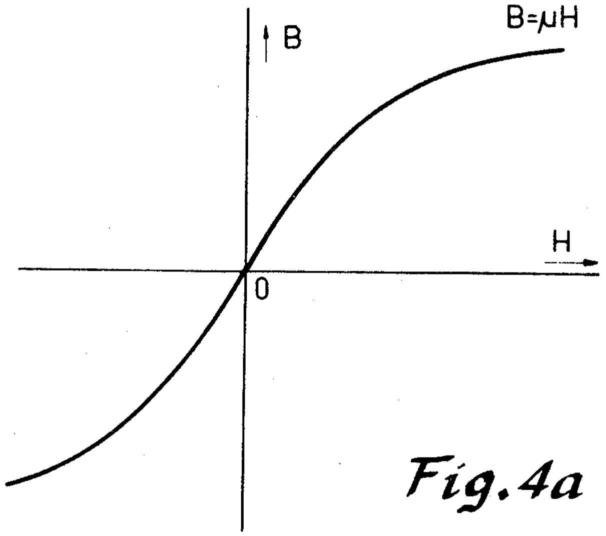
Figure 4B:
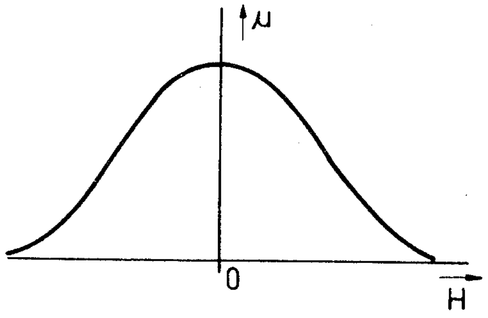

FIG. 3 shows an embodiment of the circuit arrangement according to the invention and FIG. 4*a* and 4*b* shows the variation of two magnetic magnitudes which are associated with a component of the circuit arrangement according to FIG. 3.

Figure 5A:
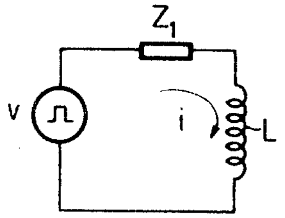
Figures 5B, 5C:
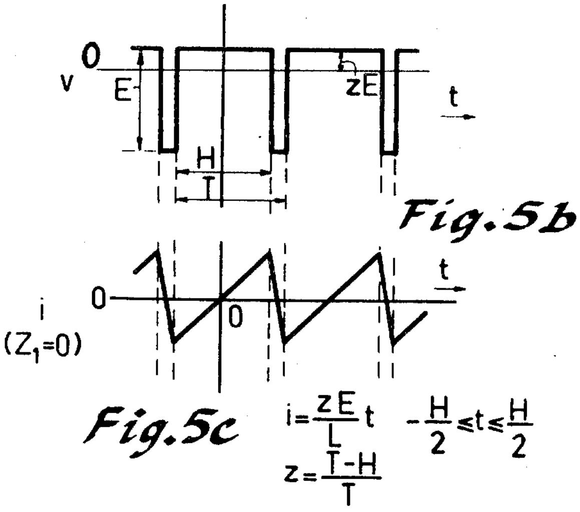

FIG. 5*a* shows a further theoretical embodiment of the circuit arrangement according to the invention, while FIGS. 5*b*, 5*c* and 6 show voltage and current waveforms which occur in the circuit arrangement according to FIG. 5*a*.

Figure 7:
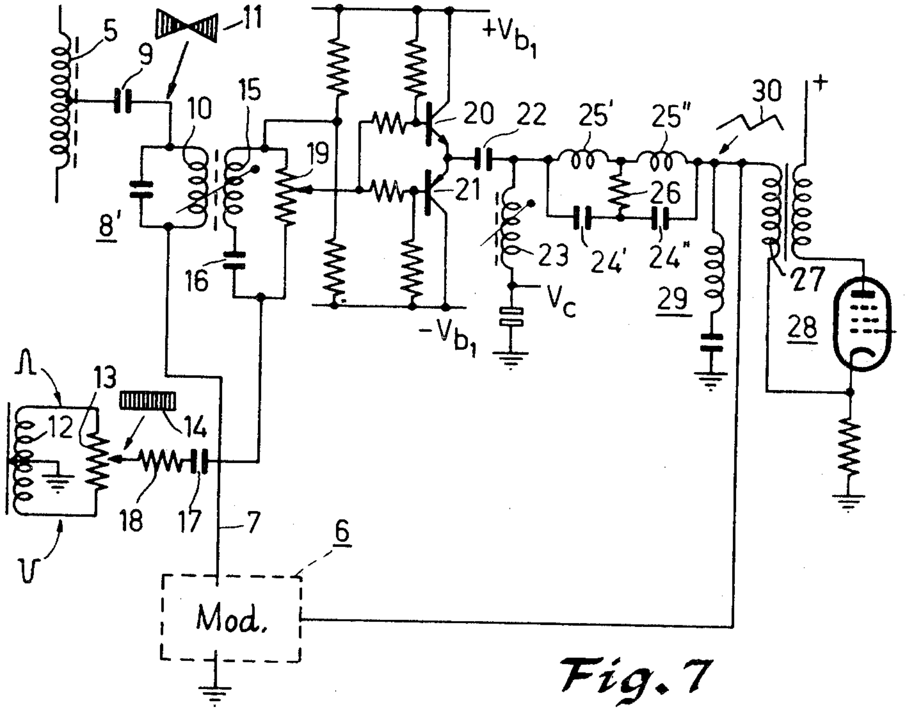

FIG. 7 shows a practical embodiment of the circuit arrangement according to FIG. 5*a*.

Figures 8A, 8B:
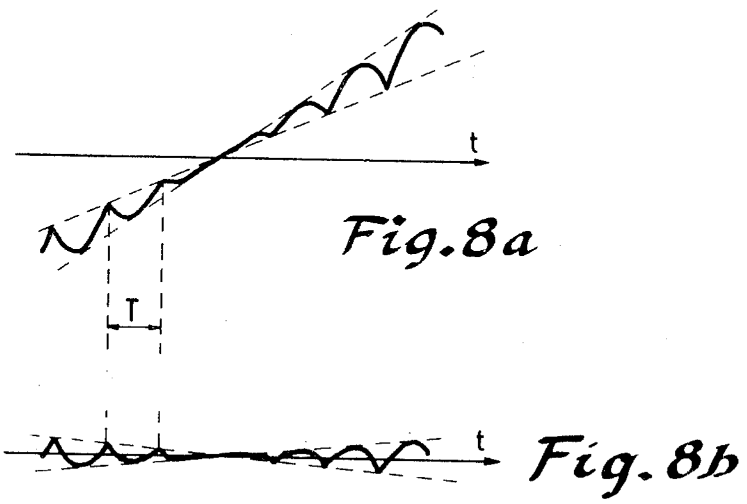

FIG. 8*a* and 8*b* shows two waveforms which occur in the circuit arrangement according to FIG. 7. FIGS. 9, 10, 11, 12 and 13 show further embodiments.

Figures 2A, 2B, 2C:
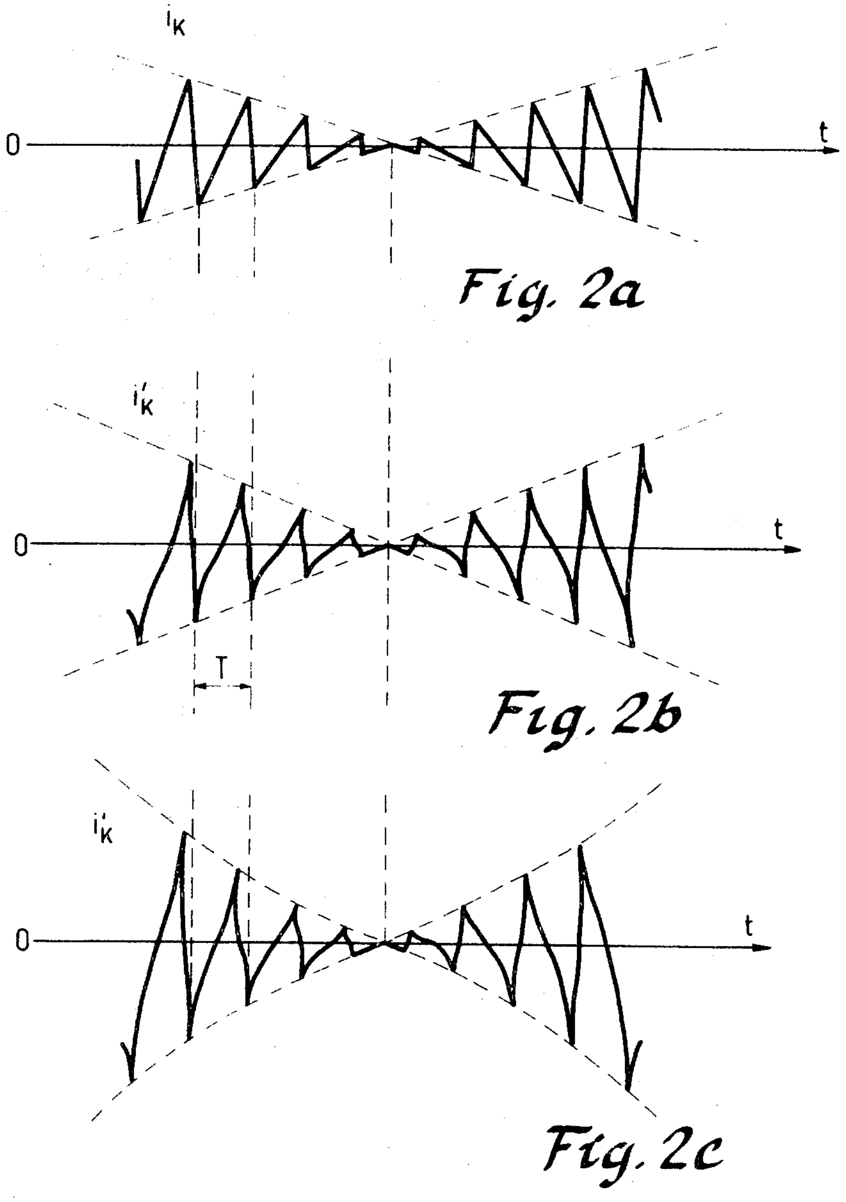

In FIG. 1 the reference $i_H$ denotes the sawtooth line deflection current which would flow during the line scan period $H$ through both line deflection coil halves if no correction at all were carried out. Curve $i_k$ represents for a given line the sawtooth correction current of line frequency whose peak amplitude varies at the field frequency, that is to say, the values for $t = O$, for $t = H$ (which are equal and of opposite sign) vary at the field frequency. Correction current $i_k$ is shown as a linear function of time in FIG. 1. As is known correction current $i_k$ in one coil half is substracted from deflection current $i_H$ and is added thereto in the other coil half. The currents $i_{H1}$ and $i_{H2}$ shown in FIG. 1 are then produced. This Figure applies to the line scan period $H$ of a given line of the field. FIG. 2*a* shows the variation as a function of time of correction currents $i_k$ for several lines on either side of the central horizontal line $x'Ox$, wherein $T$ is the overall duration of one line period and wherein the sign must vary upon passing this central line. FIG. 2*a* shows that sawtooth correction current $i_k$ has a purely linear variation during each line scan period H and that the variation of field frequency also varies linearly. The envelope of current $i_k$ shown in broken lines in the Figure is therefore a straight line. This means that the compensating deviation $\Delta x$ which is caused by the inequality of currents $i_{H1}$ and $i_{H2}$ flowing through the coil halves is proportional to the coordinates $x$ and $y$ on the screen of the display tube.

However, it has been found that the linear approximation for $\Delta x$ no longer applies as the deflection angle of the picture display tube increases. The deviation $\Delta x$ which must be introduced into the line deflection in order to eliminate the distortion caused by anisotropic astigmatism must then be higher at the beginning and at the end of each line scan period than the deviation which is the result of correction current $i_k$ in FIGS. 1 and 2*a*. This means that the deviation $\Delta x$ must not only be proportional to $x$ and to $y$, as is stated in the mentioned U.S. patent, but must also contain terms of a higher degree. The first term which is suitable is a third-degree term, since correction current $i_k$ during the line scan period changes its direction after passing the axis $y'Oy$, so that the function of $x$ must be an odd function of time. Based on this recognition, the correction current becomes substantially a third-degree function of time during the line scan period $H$. The shape thereof is shown in FIG. 1 by means of the line $i_k'$ and comes in the place of current $i_k$ of the linear approximation. FIG. 2*b* shows the new correction current $i_k'$ for several lines on either side of the central horizontal line $x'Ox$ in which case the envelope of field frequency is still a straight line.

However, it was found that this approximation was insufficient as well. In fact, if the correction current acquires a shape as is shown in FIG. 2*b*, the correction is large enough at the beginning and at the end of a line in the centre of the picture, but not on the upper and lower sides. In other words the purpose of the satisfactory colour superposition in the corners of the picture is not achieved yet. The invention is based on the recognition of the fact that an approximation is used for the envelope of field frequency of correction current $i'_k$ similar to the current of line frequency itself. In this manner the said envelope also acquires a shape which is substantially a third-degree function of time. All this is shown in FIG. 2*c*. This Figure shows that the correction current $i'_k$ in the corners is greater than in the previous cases so that the deviation $\Delta x$ produced acquires substantially the desired shape, which results in a considerably better colour superposition. An object of the invention is to generate a correction current the variation of which meets the requirements mentioned hereinbefore.

FIG. 3 shows by way of example a circuit arrangement wherein the current $i'_k$ according to FIG. 2*b* is generated. In this Figure, the reference numeral 1 denotes the line output transformer which forms part of the line deflection current generator (not shown in the Figure) of a colour picture display device. Coils 2' and 2'' denote the line deflection coil halves which are series-arranged in this embodiment so that the same sawtooth line deflection current $i_H$ passes therethrough, which current is supplied by transformer 1 and whose shape during the line scan period is shown in FIG. 1. Deflection coil halves 2' and 2'' as well as two substantially identical secondary windings 3' and 3'' on line output transformer 1 form part of a closed circuit shown in a simplified form in the Figure, through which circuit an adjustable direct current also flows in order to enable the horizontal centering of the picture displayed which current is generated in known manner by circuit arrangement 4. Furthermore, the said closed circuit includes a coil 5 on which a tapping is provided which divides the coil in two equal halves and to which the required correction current is applied. Coil 5 is shunted by the capacitor 5' for the so-called S-correction. This capacitor could have been split in two in order to create a similar tapping. However, coil 5 provides a path for the centering direct current generated by circuit arrangement 4.

The configuration described has for its object to provide a satisfactory symmetry in the circuit arrangement so that the two correction currents $i'_k$ which flow through coils 2' and 2'' are substantially equal in absolute value and have a direction which is shown by arrows in FIG. 3. The Figure shows that correction current $i'_k$ in deflection coil 2'' is added to deflection current $i_H$, while it is subtracted therefrom in coil 2'. Since the said closed circuit is a bridge circuit, the line deflection current generator (not shown in FIG. 3) which is connected to the primary side of transformer 1 and the generator still to be described for correction current $i'_k$ cannot exert influence on each other.

The reference numeral 6 in FIG. 3 denotes a modulator which generates a correction current $i_k$ in accordance with the linear approximation. Such a modulator might be, for example, the same as the one described in U.S. Pat. application Ser. No. 832,957, filed June 13, 1969, now U.S. Pat. No. 3,697,801. However, modulator 6 may be alternatively of a different type which then provides an envelope as is shown in FIG. 2*c*.

Line flyback pulses of field frequency are modulated with the aid of modulator 6 so that a current $i_k$ is produced at the output line 7 of modulator 6 at a variation such as is shown in FIG. 2*a*. This current subsequently flows through a coil 8 and a capacitor 9 of high value to the central tapping on coil 5.

Coil 8 is wound on a core of magnetic material wherein the magnetic induction $B$ as a function of the magnetic field strength $H$ has a variation as is shown in FIG. 4*a*. The variation of the permeability $\mu = B/H$ can be derived therefrom as a function of $H$ which is shown in FIG. 4*b*. In this case it has been assumed that the core material does not have substantially any hysteresis. Since the impedance of coil 8 is directly proportional to the permeability $\mu$, this impedance is thus at a maximum if a very low current to which the field strength $H$ is proportional flows through coil 8. As the current and hence field strength $H$ in one or the other direction increases (see FIG. 4*b*) this impedance decreases as a result of the saturation of the core material. Modulator 6 can be considered to be an approximation of a pulse voltage source which is loaded by two inductances one of which, the closed circuit 2', 2'', 3', 3'', 5 as "seen" from the tapping on coil 5, maintains a constant value, whereas the other, coil 8, varies in the described manner as a function of the impressed current. It can then be assumed that correction current $i'_k$ linearly varies with time if it is still low and that it increases more than linearly as soon as it assumes comparatively high values. In fact, in the latter case the load through which this current flows has become smaller. Current $i'_k$ thus has obtained substantially the desired shape shown in FIG. 1 and FIG. 2*b*. Capacitor 9 serves to DC-separate the line deflection circuit from modulator 6 which is necessary because a direct current generated by the centering arrangement 4 is superimposed on deflection current $i_H$. A practical value for capacitor 9 is 2.2 $\mu F$.

The correction current generated by the circuit arrangement described has a shape which is dependent on the amplitude of the current which is provided by modulator 6. It may be desirable to use an embodiment of the circuit arrangement according to the invention in which this dependence is not present. In FIG. 5*a* a current $i$ is produced through the series arrangement of an impedance $Z_1$ and a coil $L$ as a result of a voltage $v$ provided by a pulse voltage source. Source $v$ represents modulator 6 of FIG. 3, while $L$ is the inductance of the line deflection circuit as "seen" from modulator 6 and $Z_1$ is to be described further.

The (idealized) voltage $v$ in FIG. 5*b* has the following Fourier development:

$$v = a_1 \cos \omega t + a_2 \cos 2 \omega t + \ldots + a_m \cos m \omega t$$

wherein it has been assumed that the origin of the time axis lies in the centre of one scan. The various coefficients $a_1, a_2, \ldots a_m, \ldots$ are ($m$ is an integer):

$$a_1 = \frac{2E}{\pi} \cdot \frac{\sin \frac{\omega H}{2}}{1} \quad a_2 = \frac{2E}{\pi} \cdot \frac{\sin \frac{2\omega H}{2}}{2} \quad a_m = \frac{2E}{\pi} \cdot \frac{\sin \frac{m\omega H}{2}}{m}$$

wherein $H$ is the duration of the line scan period, $T$ is that of the overall line period and $E$ is the amplitude of the pulses. The angular frequency $\omega = 2\pi/T$ corresponds to the line repetition frequency.

During the scan current $i$ without impedance $Z_1$ would have a sawtooth shape: $i = (zE/L)\ t$. If impedance $Z_1$ is required to have an impedance of zero for all angular frequencies, except $\omega$, then we obtain with the aid of impedance $Z_1$:

$$i = (zE/L)\ t - k \cdot (a_1/\omega L) \sin \omega t$$

wherein the voltage of the angular frequency $\omega$ is attenuated by a factor of $k < 1$.

This sine function can be developed and becomes $$i \approx (zE/L)\ t - k \cdot (a_1/\omega L)\ (\omega t - [\omega^3 t^3/3'])$$

wherein the terms of an order higher than the third order in the series development have been ignored (for the following term must be divided by $5' = 120$). This function must be monotonically increasing if the desired shape is to be obtained. To this end the first-degree term must be positive which gives a maximum value for $k$, that is, a given ratio between $Z_1$ and $\omega$ $L$. If $k$ is higher than the limit value thus defined, then $i$ has a minimum during the second half of the scan and a maximum during the first half thereof, in other words, it reverses its direction three times during the scan period which is of course undesirable.

Figure 6A:
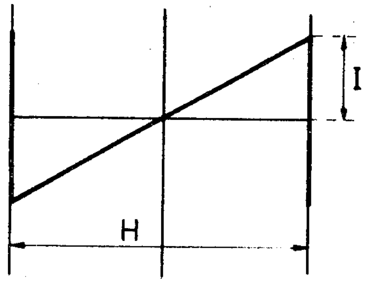
Figure 6B:
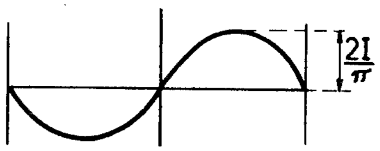
Figure 6C:
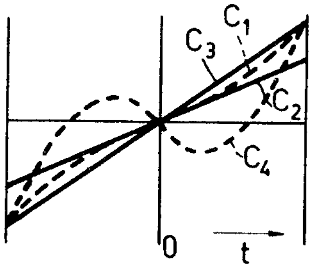

The above may also be represented graphically. FIG. 6*a* shows the variation as a function of time for a sawtooth current of line frequency, the flyback period being assumed to be infinitely small for the sake of simplicity. This current is symmetrical relative to the origin chosen in the centre of the scan period $H$ and is therefore an odd function of time. It follows that the fundamental component thereof is a sine function as is shown in FIG. 6*b*, which function must be substracted from the sawtooth function. In FIG. 6*c* the reference c1 denotes the curve which is obtained with the aid of the circuit arrangement according to FIG. 3, and the reference *c*2 denotes the curve corresponding thereto in accordance with the linear approximation. This is understood to mean that curve *c*2 indicates the variation as a function of time of the current which is produced by modulator 6 of FIG. 3, while curve *c*1 is obtained therefrom by means of coil 8. The same curve *c*1 must now be obtained with the aid of the circuit arrangement according to FIG. 5 wherein source *n* would generate a current *c*3 if impedance $Z_1$ were not present. Since the impedance of $Z_1$ cannot be infinitely great (in which case the above-mentioned factor $k$ would be equal to 1), only part of the sine function is substracted. This part (that is to say, $k$) and the peak amplitude of current *c*3 (FIG. 6*c*) may be chosen in such a manner that this substraction exactly provides curve *c*1. In this case this generated current *c*3 must have a higher amplitude than the current (= *c*2) which was necessary in the other case. It is evident that too great a factor of $k$ would provide a curve such as *c*4 in FIG. 6*c*, as is described above.

In practice, impedance $Z_1$ can be formed as an LC-parallel circuit tuned to the line frequency. Thus a parallel resonance on the line frequency is produced in the network $Z_1$, $L$ and a series resonance is produced at a higher frequency for which the circuit behaves as a capacitance. The last-mentioned frequency can be rendered high enough to be left out of consideration hereinafter. If the value of $Q$ of the parallel circuit is sufficiently high, the angular frequency $\omega$ and only this frequency is (partially) suppressed. The impedance of the circuit is purely resistive for this angular frequency, namely $R_1$. Then the following equation applies:

$$a_1 \cos \omega t = i_1 R_1 + L\ (di_1/dt)$$

wherein $a_1$ is the first coefficient already calculated of the Fourier development of the pulsatory voltage $v$, while $i_1$ is the component of line frequency of the impressed current.

The solution for this equation is:

$$i_1=\frac{R_1}{R_1^2+\omega^2L^2}\,a_1\left(\cos\,\omega t-e^{-\frac{R_1}{L}t}\right)+\frac{\omega L}{R_1^2+\omega^2L^2}\,a_1\sin\,\omega t$$

wherein the condition of $i_1 = 0$ has been filled in for $t = 0$. At the beginning of the scan $t = -H/2$ for which there applies:

$$i_1=\frac{R_1}{R_1^2+\omega^2L^2}\,a_1\left(\cos\frac{\omega H}{2}-e^{-\frac{R_1H}{2L}}\right)-\frac{\omega L}{R_1^2+\omega^2L^2}\,a_1\sin\frac{\omega H}{2}$$

and at the end thereof $t = H/2$ for which there applies $$i_1=\frac{R_1}{R_1^2+\omega^2L^2}\,a_1\left(\cos\frac{\omega H}{2}-e^{-\frac{R_1H}{2L}}\right)+\frac{\omega L}{R_1^2+\omega^2L^2}\,a_1\sin\frac{\omega H}{2}$$

It is evident that these two values of $i_1$ are not equal in obsolute value unless $R_1$ is very small which contradicts the imposed requirement of selectivity. To determine the constants in the differential equation it would of course have been possible to impose the condition that $i_1\,(t=-[H/2]) = -\,i_1\,(t=+[H/2])$, but then $i_1\,(t=0)$ would not have been zero. In other words, a waveform is obtained which is phase shifted relative to the saw-tooth wave deviating from the sine wave of the (theoretical) case of FIG. 6b. Thus it is not possible to obtain curve $c_1$ of FIG. 6c with the aid of this circuit tuned to the line frequency.

Therefore the invention is based on the recognition of the fact that impedance $Z_1$ of FIG. 5a is formed as an LC parallel circuit which is not tuned to the line frequency, but to a frequency which lies between this line frequency and twice its value. In that case the angular frequencies $\omega$ and $2\omega$ are attenuated by factors of $k_1$ and $k_2$, respectively, while the angular frequencies $3\omega$, etc. are substantially not attenuated. The impressed circuit then becomes $$i=\frac{zE}{L}\,t-k_1\cdot\frac{a_1}{\omega L}\sin\,\omega t-k_2\cdot\frac{a_2}{2\omega L}\sin\,2\omega t\approx\frac{zE}{L}\,t$$
$$-k_1\cdot\frac{a_1}{\omega L}\left(\omega t-\frac{\omega^3t^3}{3^1}\right)-k_2\,\frac{a_2}{2\omega L}\left(2\omega t-\frac{8\omega^3t^3}{3^1}\right)$$

with the series development of the sine function already employed. It is evident that the attenuation factors $k_1$ and $k_2$ depend on the tuning frequency and on the values of the circuit elements. As has been done above, the equations can be written for the line frequency component $i_1$ and for the double line frequency component $i_2$ of the current produced by the source. As a result two optional degrees are available because both $k_1$ and $k_2$ can be chosen optionally so that both the condition $i_1 + i_2 = 0$ at the instant $t = 0$ can be satisfied and the condition that $i_1 + i_2$ for both $t = -(H/2)$ and for $t = +H/2$ are equal to each other in absolute value and are of opposite sign. In this manner the proportioning of the LC-circuit can be determined. Its tuning frequency then lies at, for example, 19.6 kHz at a line frequency of 15,625 kHz. (625 lines per picture).

FIG. 7 shows an embodiment of a circuit arrangement according to the invention wherein the elements occurring in FIG. 3 have the same reference numerals and wherein the saturable coil 8 constituted by a parallel circuit 8' is replaced by a coil 10 and a capacitor which is tuned to the angular frequency between $\omega$ and $2\,\omega$. In addition to the advantage already mentioned that the produced correction current is not amplitude-dependent, the described method of producing the correction current relative to the first method described in FIG. 3 provides a further advantage which will now be further described. Since the tuning of parallel circuit 8' is located closer to $\omega$ than $2\omega$, this circuit has a much higher impedance for the line frequency than the rest of the path through which the correction current flows, so that a substantially sinusoidal voltage of line frequency is produced across the terminals of this circuit, which voltage is additionally modulated at the field frequency. The variation of this voltage is shown by 11 in FIG. 7. The invention is based on the recognition of the fact that this voltage is used for the correction of the so-called North-South pincushion distortion, which is the the pincushion distortion produced in the vertical direction on picture display tubes having a substantially flat screen. As is known the current flowing through the field deflection coils must be modulated at the line frequency for this purpose, which current must have a substantially parabolic variation during one line period. All this is shown in FIG. 8a for the period corresponding to several lines on either side of the central horizontal line.

In FIG. 7 coil 10 of parallel circuit 8' constitutes the primary winding of a transformer. Winding 12 is a secondary winding which is wound on the line output transformer and which has a central tapping connected to earth. A potentiometer 13 is connected parallel thereto on whose wiper a pulsatory voltage 14 of line frequency is produced an amplitude and a polarity which are dependent on the position of the wiper. If this wiper is in the centre of potentiometer 13, voltage 14 is zero. If it is positioned at one end, the amplitude of voltage 14 is at a maximum and the pulses have a certain polarity. If the wiper is positioned at the other end of potentiometer 13, the amplitude of voltage 14 is likewise at a maximum and the pulses have a polarity which is opposite relative to the previous case. The reference numeral 15 in FIG. 7 denotes the secondary winding of the transformer the primary winding of which is coil 10 which forms part of parallel circuit 8'. Winding 15 is connected through capacitors 16 and 17 and a resistor 18 to the wiper on potentiometer 13, while a further potentiometer 19 is parallel-arranged with the series network of winding 15 and capacitor 16.

After having undergone a givenphase shift by means of resistor 18 and capacitor 17, pulsatory voltage 14 is added to the modulated sinusoidal voltage which is produced across winding 15 and which is also slightly phase-shifted by means of capacitor 16. Part of the voltage obtained by the addition of these voltages is applied through the wiper on potentiometer 19 to a complementary pair of two output transistors 20 and 21 which are class-B adjusted and which constitute a so-called single ended push-pull. These transistors are fed by means of a positive voltage $+V_{b1}$ and a negative voltage $-V_{b1}$. The voltage amplified by these transistors is applied through a capacitor 22 to a coil 23 the other end of which is connected to earth with respect to alternating voltages. The series network of capacitor 22 and coil 23 is tuned to the line frequency so that the sinusoidal voltage of line frequency which is produced across the terminals of coil 23 is many times higher than the voltage provided by the (voltage) source 20, 21. Using a value of 47 *nF* for capacitor 22 and an inductance of approximately 2 nH for coil 23, it is possible to obtain a peak-to-peak amplitude of 200 V at the beginning and at the end of the field scan period, while transistors 20 and 21 may be suitable for low voltage and low powers. The junction of capacitor 22 and coil 23 is connected to the series arrangement of field deflection coils 25' and 25'' which is shunted by the series arrangement of two capacitors 24' and 24'' of substantially equal value while the junctions of coils 25' and 25'' and capacitors 24' and 24'' are mutually connected by a resistor 26 of comparatively small value. Both series network are connected to, for example, a secondary winding 27 of the field output transformer 28. The junction of the field deflection coil 25'' and secondary winding 27 is connected to earth with respect to the line frequency through an absorption circuit 29 which absorption circuit in this embodiment is a series circuit of a coil and a capacitor and which is tuned to the line frequency. In this manner the junction of coil 25'' and winding 27 is connected to earth with respect to the line frequency and the junction of coils 25' and 23 is connected to earth with respect to the field frequency, so that the line frequency generator 20 to 23 and the field deflection generator cannot exert influence on each other.

Since the series network 22, 23 is tuned to the line frequency, the distortion produced by the parallel circuit 8' is eliminated and a sinusoidal current of line frequency which is modulated at the field frequency and which can be assumed to be substantially parabolic flows through field deflection coils 25' and 25'', which current has a shape as shown in FIG. **8*b*. On the other hand, the sawtooth current 30 of field frequency flows through coils 25', 25'' so that the current shown in FIG. 8*a* is obtained, which is the sum of the current shown in FIG. 8*b* and the sawtooth current 30.**

The point at which the substantially parabolic current of FIG. **8*b* becomes zero can be shifted to the left or to the right by means of the wiper on potentiometer 13 so as to correct a possible assymetry in the picture tube and/or in the line deflection coils. The central horizontal line is straightened thereby. The said phase shifts caused by elements 16, 17 and 18 are chosen in such a manner that the two voltages to be added the sum of which is applied to amplifier 20, 21** mutually have the correct phase.

Potentiometer 19 is an amplitude control device and the adjustment of the inductance of coil 23 is a phase control device for the North-South correction. Field deflection coils 25', 25'' have a large natural inductance which in connection with their parasitic capacitances is harmful for the line frequency because the North-South correction current is then not equally distributed. This distribution is improved by the two capacitors 24' and 24'' of substantially equal value while possible interference resonances are damped by means of resistor 26 of, for example, 1 kohm. The lower side of coil 23 is connected to earth at one end through a bipolar capacitor 31 of high capacitance and at the other end to a variable direct voltage $V_c$ which may be both negative and positive so that a current for the vertical centering flows through field deflection coils 25', 25''.

Modulator 6 will now be described wherein the sawtooth correction current $i_k$ of line frequency whose amplitude veries at the field frequency is produced. Such a modulator might be of the same type as that described in said U.S. Pat. application Ser. No. 832,957. The correction current produced by this modulator cannot, however, be used without any difficulty because this current is proportional to the vertical deflection *y* according to FIG. 2*a*.

Figure 9:
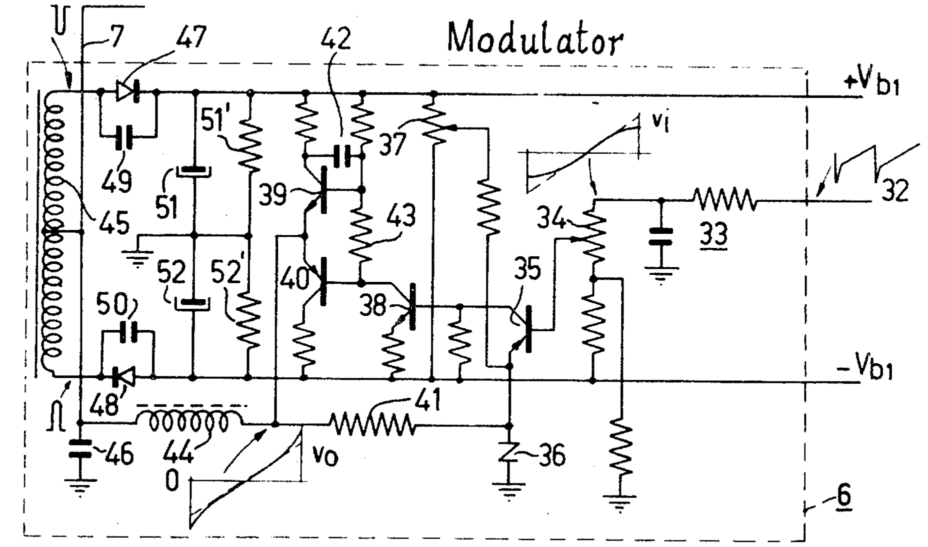

The voltage 32 originating from the field output generator of FIG. 9 is integrated by means of a network 33 constituted by a resistor and a capacitor in order to eliminate the voltage peaks which occur in voltage 32. The substantially sawtooth voltage then obtained is applied through an amplitude control device 34 to an amplifier. The first transistor 35 in this amplifier has a voltage-dependent resistor 36 as the emitter resistor, while its emitter voltage can be adjusted by means of a potentiometer 37 arranged between the supply voltage $+V_{b1}$ and $-V_{b1}$. The voltage present on the collector of transistor 35 drives a driver transistor 38 whereafter it is applied to a final amplifier comprising in this Example a complementary pair of two transistors 39 and 40. A negative feedback resistor 41 is arranged between the interconnected emitters of transistors 39 and 40 and the emitter of transistor 35. In order to avoid possible oscillations a capacitor 42 which has a small value for the field frequency is arranged between the collector and the base of transistor 39. The base currents of these transistors can be adjusted by means of the small resistor 43 which is arranged between the bases of the transistors 39 and 40 so as to ensure that one transistor is still slightly conducting at the instant when the other starts to conduct.

The sawtooth of field frequency which is present at the output of the amplifier, that is to say, at the common point of transistors 39 and 40, is subsequently applied through a coil 44 to the central tapping on a winding 45 which is wound on the line output transformer. A capacitor 46 is arranged between this central point and earth, while the same point is connected through lines 7 to elements 8 and 8' shown in FIGS. 3 and 7. Coil 44 represent a high impedance for the line frequency and a low impedance for, the field frequency, while capacitor 46 is chosen in such a manner that it constitutes a resonant circuit with the line deflection circuit so that the period of the resonant frequency thereof is substantially twice the line flyback period. Two diodes 47 and 48 are arranged between the ends of winding 45 and the lines $+V_{b1}$ and $-V_{b1}$ which diodes are shunted by two capacitors 49 and 50, respectively. The direction of conductivity of these diodes is chosen to be such that the line flyback pulses which are produced at the ends of winding 45 block these diodes. The diodes function as an electronic switch so that a pulsatory voltage of line frequency is produced on the central tapping on winding 45, which voltage is modulated by a sawtooth voltage of field frequency. The operation of the modulator is the same as that of the modulator described in said U.S. patent application Ser. No. 832,957 with this difference, however, that one of the diodes relative thereto is reversed. The current which would flow through line 7 as a result of the presence of elements 8 and 8' and the other inductances in the circuit, but in the presence of a linear resistor instead of a voltage-dependent resistor 36, would thus be current $i'_k$ of FIG. 2*b*.

The correction current $i'_k$ according to FIG. 2*c* is produced because resistor 36 is voltage-dependent and is incorporated in the negative feedback loop of the amplifier 35 to 41 inclusive. The input voltage $v_i$ of this amplifier is shown in FIG. 9 and is applied to the base of transistor 35. Input voltage $v_i$ is substantially sawtooth-shaped, except at the beginning and at the end of the field scan period when it is somewhat smaller than the value corresponding to the sawtooth as a result of the socalled S-correction in the field deflection generator. Since output transistors 39 and 40 are fed by two supply voltage $+V_{b1}$ and $-V_{b1}$ which are symmetrical relative to earth, the mean value of the output voltage of the amplifier, that is to say, on the common point of transistors 39 and 40, is zero. If transistor 35 and potentiometer 37 were not present, the mean voltage across resistor 36 would be zero too. The wiper on potentiometer 37 can be displaced in such a manner that the mean value of the said voltage is also zero when the elements 35 and 37 are also present. In the centre of the field scan period at which the current through voltage-dependent resistor 36 is small, its resistance as well as the feedback factor is high with the result that the amplification of the amplifier is comparatively small. However, at the beginning and at the end of the field scan period the current flowing through resistor 36 becomes high so that its resistance as well as the negative feedback factor become low and the amplification of the amplifier increases. As a result the output voltage of the amplifier assumes the shape which is indicated by $v_O$ in FIG. 9. The envelope of the field frequency-modulated current of line frequency flowing through line 7 then has the shape as shown in FIG. 2*c*. Since the line frequency sawtooth current through line 7 is distorted by means of elements 8 and 8', the object of the invention, that is, a better colour superposition in the corners of the screen of the picture display tube has been achieved.

As already stated, switching diodes 47 and 48 are arranged between the ends of winding 45 and the lines are indicated by $+V_{b1}$ and $-V_{b1}$, respectively. The described amplifier 35 to 41 inclusive is arranged between the last-mentioned lines as well as two equal electrolytic capacitors 51 and 52 of high capacitance which are shunted by two equal resistors 51' and 52' and the common point of which is earthed. Since diode 47 conducts for a given time during the line scan period ("opening angle" of the diode functioning as a peak rectifier) a positive voltage is produced at its cathode, that is to say, at the point $+V_{b1}$ (see FIG. 9), whereas a negative voltage is produced in a corresponding manner at the anode of diode 48. These direct voltage are smoothed by means of capacitors 51, 52. Resistors 51' and 52' ensure that they are equal in absolute value. The supply direct voltages produced in this manner then serve as voltage supply sources for the amplifier 35 to 41 inclusive and can be used without any objection for other parts of the picture display device such as, for example, for the supply of the convergence circuit or of the amplifier 20, 21 for the North-South correction described in FIG. 7. In a practical embodiment in which the line flyback pulses had a peak amplitude of 170 V the produced direct voltages $+V_{b1}$ and $-V_{b1}$ were equal to $+20V$ and $-20V$, respectively. It is even desired that the load current provided by these supply voltage be high, for the greater this current the larger the opening angle of the diodes and the better the modulator functions.

Diodes 47 and 48 function as switching diodes for modulator 6 and also as rectifiers for generating the previously described supply voltage. The condition for a satisfactory functioning of this circuit is that the line flyback pulses present at the ends of winding 45 do not contain modulation which would originate for example, from an East-West field correction circuit or do not contain any parabola component which might be caused by a booster capacitor of too low a value in the line deflection generator. Since the value of capacitors 51 and 52 are high, so that voltage $+V_{b1}$ and $+V_{b1}$ are substantially constant, diodes 47 and 48 would not at all be able to conduct during a number of line scan periods when the amplitude of the line flyback pulses decreases, so that a modulator action of diodes 47 and 48 would be impossible. If the line deflection generator of the picture display device in which the circuit arrangement according to the invention is used comprises two generators as described in the U.S. Pat. application Ser. No. 012,346, filed Feb. 18, 1970, winding 45 must therefore be wound on the transformer of the main line output generator which is not East-West modulated. It is true that this main generator is not stabilised against variations in the mains voltage, but also due to the action of the smoothing capacitors of high value in the supply of thee display device these variations are much slower than those which are caused by the East-West correction and can therefore followed by capacitors 51 and 52. It is true that the opening angle of the diodes might be enlarged by connecting, for example, resistors in series therewith so that all variations in the amplitude of the line flyback pulses would be admitted, but this would have the drawback that the dissipation would be uselessly increased and that the modulator would have a resistive internal impedance which is undesirable because the load thereof is inductive.

Potentiometer 37 by which the means voltage across voltage-dependent resistor 36 can be adjusted is a symmetry control device by which the zero crossing of the envelope of correction current $i_k$ of FIG. 2*c* can be shifted in order to take tolerances in the different elements of the picture display device into account. Therefore the central horizontal line can be adjusted by means of potentiometer 37. Capacitors 49 and 50 have a comparatively low capacitance (in the order of 330 pF) and have for their object to decrease the frequency of possible RF interference which may be caused by the steep edges of the switching currents through the diodes.

Figure 10:
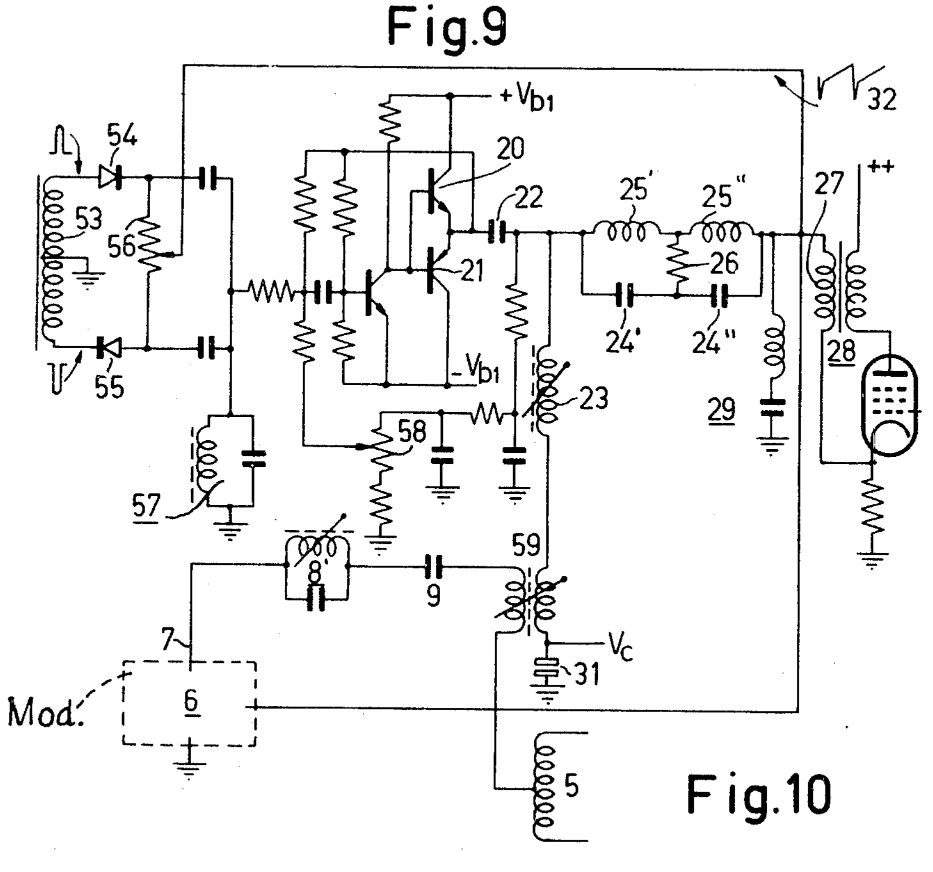

FIG. 10 shows a modification of the circuit arrangement according to FIG. 7. In fact, in FIG. 7 the current produced by modulator 6 is also used for the North-South correction. It is then possible that the adjustment of modulator 6 influences that of the North-South correction circuit and conversely so that the adjustment of both may become more difficult. For this reason a separate North-South modulator is used in FIG. 10, which does not receive information from modulator 6 and consequently coil 10 is not coupled to a secondary winding.

The North-South modulator consists of a winding 53 wound on the line output transformer and two diodes 54 and 55 which, unlike the diodes 47 and 48 in modulator 6, are arranged in such a manner that they are rendered conducting by the line flyback pulses. A potentiometer 56 is arranged between the other ends of diodes 54 and 55, the wiper of which potentiometer receives a sawtooth voltage 32 from the field output stage. The said ends are capacitively connected to a parallel circuit 57 which is tuned to the line frequency. The impedance of this circuit is very low for the field frequency so that the field frequency voltage present on the wiper of potentiometer 56 is somewhat integrated so that the peaks in voltage 32 disapear. When the wiper on potentiometer 56 is positioned in the centre, a voltage which has the same shape as the current shown in FIG. 8*b* is produced across the terminals of parallel circuit 57 because the component of field frequency is short-circuited by circuit 57 and which is subsequently applied to an amplifier which is substantially the same as that in FIG. 7. The desired current flows through field deflection coils 25′ and 25″ and both generators 20, 21 and 28 are decoupled relative to each other in the same manner as in FIG. 7.

In this embodiment a negative feedback is used so that resistor 58 of FIG. 10 functions as an amplitude control device. Since the *Q*-value of the series network 22, 23 is high, the voltage across coil 23 would oscillate at the same phase at the beginning of the field scan period as at the end of the previous field scan period, while an opposite phase is required, which would have a disturbing effect on the lines on the upper side of the screen of the picture display tube. Due to the negative feedback from coil 23 to the input of the amplifier it is, however, ensured that the phase is quickly corrected during the field feedback period.

By displacing the wiper on potentiometer 56 the zero crossing of the voltage of FIG. 8*a* can be shifted. This potentiometer therefore permits of a control of the symmetry between the upper and lower portions of the displayed picture.

The correction current which is produced by incorporating parallel circuit 8′ in the line 7 originating from modulator 6 reaches in the embodiment of FIG. 10 the central tapping on coil 5 through isolation capacitor 9 and the primary winding on a transformer 59. The secondary winding thereof is arranged in series with coil 23 and this series network is tuned to the line frequency with the aid of capacitors 22. Thus, a sinusoidal voltage of line frequency which is modulated at the field frequency, as shown in FIG. 8*b*, is present across the terminals of the primary winding of transformer 59. This voltage causes a current to flow through the line deflection circuit which current is added to the correction current supplied thereto by the modulator 6 and parallel circuit 8′. This step envisages an improvement of the correction in the corners of the screen of the picture display tube, that is to say, the correction current consequently becomes equally high in absolute value both at the beginning and at the end of the line scan period.

The voltage which is present across the terminals of winding 45 (see FIG. 9) of modulator 6 in in fact not constant during the line scan period, for the line output transformer and the deflection coils are not free from resistance and the voltage drop thereacross increases as the deflection current increases. Since, as is known, the deflection current at the end of the scan is higher in absolute value than at the beginning, the said voltage is lower at the end of the scan. This effect is aggravated in that the voltage drop across the booster diode which is present in the line deflection generator less than linearly varies with the current, with the result that the voltage across winding 45 still higher at the beginning of the scan during which period the booster diode conducts to a greater extends. A sinusoidal current is then introduced by means of transformer 59 which current has a phase and an amplitude such that the influence of the varying voltage during the scan period as described above is eliminated. Since the introduced current originates from the North-South correction circuit, it is higher at the beginning and at the end of the field scan period, which is favourable because the correction current supplied to the line deflection coils is then higher too.

Since the diodes 54 and 55 of the modulator for the North-South correction conduct during the line flyback period, the line flyback pulses present across winding 53 need not be great. Winding 53 may in addition be wound on the output transformer which is controlled by the auxiliary generator if the present invention is used in a picture display device as is described in said U.S. Pat. application Ser. No. 012,346. It is true that the line flyback pulses are then modulated by a parabola voltage of field frequency in order to correct the East-West pincushion distortion, but this modulation does not exert influence in this case, for the difference between the currents flowing through diodes 54 and 55 is exclusively determined by the voltage present on the wiper on potentiometer 56, provided that the pulses are sufficiently great.

Figure 11:
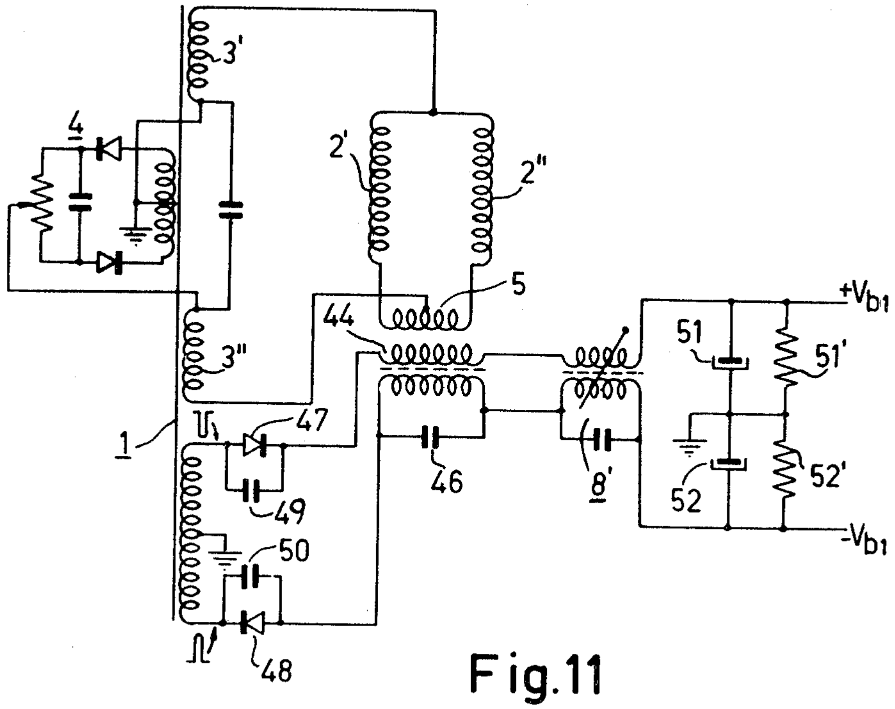

In the circuit arrangements according to the invention described so far both the line and the field deflection coil halves were arranged in series. It is self-evident that the principle of the invention is not affected when the line and/or the field deflection coil halves are arranged in parallel. FIG. 11 shows an embodiment wherein the line deflection coils are parallel arranged. Corresponding elements have the same reference numerals as those in the previous Figures.

However, the following may occur in the described circuit arrangements according to FIGS. 3, 7, 9, 10 and 11. Modulator 6 includes the diodes 47 and 48 which are controlled by the additional winding 45 wound on the line output transformer 1, which diodes are blocked during the line flyback period. A central tapping is connected through parallel circuit 8′ in series with the junction of the two line deflection coil halves 2′ and 2″. If either of these diodes becomes deflective, so that it constitutes a short circuit, one half of the additional windings is short-circuited by the rest of the modulator. This effect may be harmful for this winding and also for the entire line output transformer. If the switching element in the line output stage is a transistor, this transistor may likewise be damaged.

Figure 12:
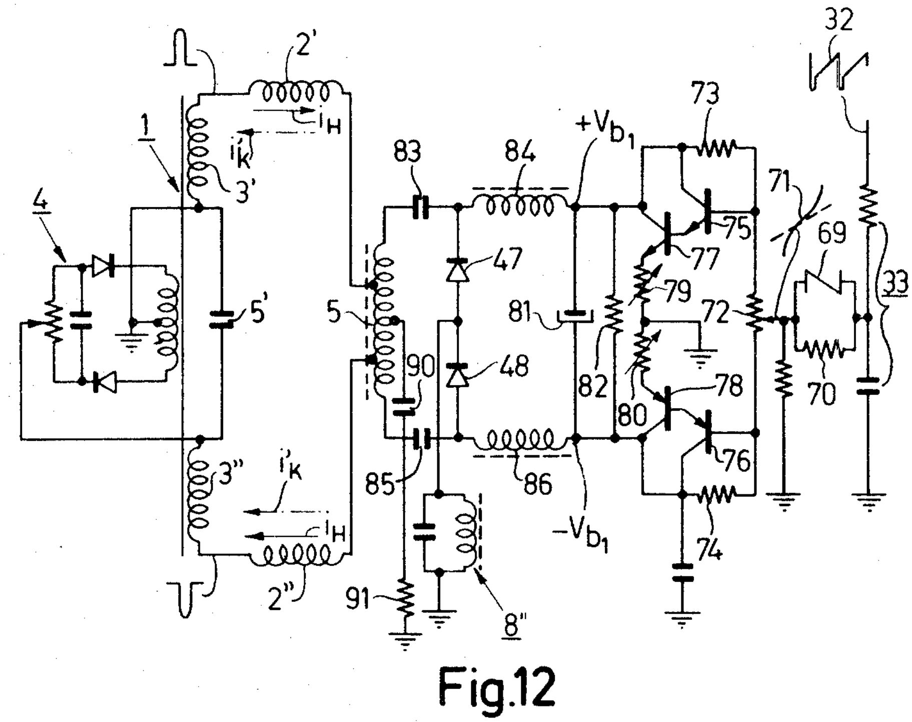
Figure 13:
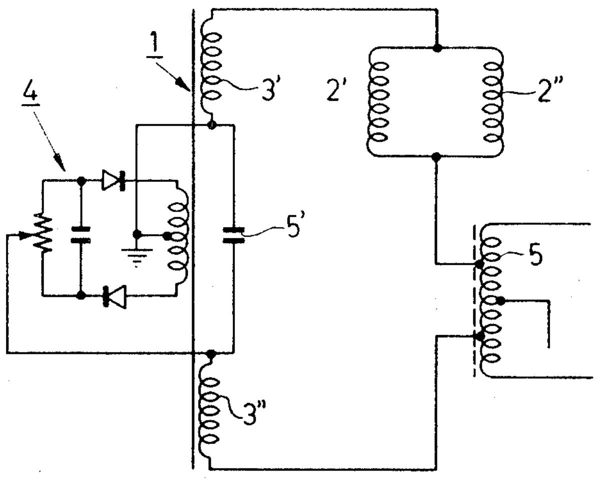

FIGS. 12 and 13 show circuit arrangements in which the line output transformer and/or transistor are safeguarded from the described drawback.

In FIG. 12 the elements having the reference numerals 1, 2', 2'', 3', 3'' and 4 represent the same elements as those in FIG. 3. Furthermore the circuit arrangement includes a coil 5 on which two tappings which are symmetrical relative to the electric central point of the coil are provided and to which coil halves 2' and 2'' are connected. Likewise as in FIG. 3, a closed circuit is thus constituted by windings 3' and 3'', circuit 4, deflection coil halves 2' and 2'' and part of coil 5. Circuit 4 is shunted by the capacitor 5' for the S-correction, while coil 5 also provides a path for the centering direct current produced by circuit 4. During the line scan period the central point of coil 5 has substantially earth potentional and the correction current is produced from this central point. Circuit 4 also has an earthed central point so that the entire entire circuit is symmetrical.

The part shown to the right of coil 5 in FIG. 12 shows the modulator wherein correction current $i'_k$ is generated and which slightly deviates from the embodiment of FIG. 9. The voltage 32 originating from the field output generator is applied after integration to the parallel arrangement of a voltage-dependent resistor 69 and a linear resistor 70. Thus, a waveform denoted by the reference numeral 71 in FIG. 12 is produced at the other connection of this parallel arrangement, which waveform has the desired shape. In fact, the value of voltage-dependent resistor 69 is high in the centre of the scan, because the voltage thereacross is then low, whereas this value is low at the beginning and at the end of the scan so that the resultant voltage then increases more than linearly. The voltage thus obtained is applied to the wiper on a potentiometer 72. The connections of potentiometer 72 are connected through two resistors of high value 73 and 74 to the supply voltages $+V_{b1}$ and $-V_{b1}$, respectively. The same connections control the bases of two transistors 75 and 76, transistor 75 being of the npn-type and transistor 76 being of the pnp-type and which control two power transistors 77 and 78 in such a manner that transistors 75, 77 and 76, 78 constitute so-called Darlington pairs. The adjustment of transistors 77 and 78 is determined by two variable emitter resistors 79 and 80 respectively, the free end of which is connected to earth. The collectors of transistors 77 and 78 are connected to lines $+V_{b1}$ and $-V_{b1}$, while an electrolytic capacitor 81 of high capacitance and a resistor 82 are arranged between the said lines. Thus the entire circuit arrangement which is shown in FIG. 12 to the left of transistors 78 nd 77 constitutes the collector load for said transistors.

One end of coil 5 is connected through a capacitor 83 and a choke coil 84 to line $+V_{b1}$, while the other end of coil 5 is connected in a corresponding manner through a capacitor 85, which has the same capacitance a capacitor 83, and a choke coil 86 to line $-V_{b1}$. Two diodes 47 and 48 are series arranged between the junctions of capacitors 83 and choke coil 84, and capacitor 85 and choke coil 86 respectively, the junction of said diodes being connected to earth through an LC parallel circuit 8''. Diodes 47 and 48 are arranged at such a polarity that they are blocked during the line flyback period, while parallel circuit 8'' is tuned to a resonant frequency which lies between the line frequency and twice the value thereof. In this manner the two direct voltages which are indicated by $+V_{b1}$ and $-V_{b1}$ are present across capacitor 81, and two line frequency pulsatory voltages having a field frequency varying amplitude and opposite polarity are present across the connections of coil 5.

A central tapping is provided on coil 5 which tapping is connected to earth through the series arrangement of a capacitor 90 and a resistor 91. Capacitor 90 constitutes a resonant circuit together with the line deflection circuit so that the period of the resonant frequency thereof is substantially twice the line flyback period. Choke coils 84 and 86 have a high impedance for the line frequency, but a low impedance for the field frequency so that they block the path for the line frequency pulses but not for the field frequency voltage. The correction current of the lower and the upper portion of the picture can be separately adjusted by means of the varable emitter resistors 79 and 80, respectively, while potentiometer 72 makes a symmetry control possible so that the zero crossing of the envelope of the correction current can be shifted, which is an adjustment of the central horizontal line.

Since the voltage present across the terminals of the winding on the line output transformer is not constant during the line scan period, a sinusoidal current of line frequency originating from a North-South correction circuit had to be added to correction current $i'_k$ in the circuit arrangement according to FIG. 10. Duee to the presence of resistor 91 this step can be omitted. During the scan the modulator supplies a sawtooth current to the series arrangement of half the coil 5 and resistor 91 which has a small value of approximately 100 ohms. The voltage across said series arrangement then is the sum of a pulse and a sawtooth voltage so that the voltage at the end of the scan is higher than tat at the beginning. This effect is opposite to the effect previously described, namely the voltage at the end of the scan is lower than tat at the beginning. It is possible to choose a suitable value for resistor 91 in order that both effects compensate each other so that a very satisfactory correction is possible. A further advantage thereof is the following. As already stated, the line deflection circuit in combination with capacitor 90 behaves as a resonant circuit during the line flyback period which circuit might oscillate after the end of this flyback period before diodes 47 and 58, which are in fact not perfect, cut off these oscillations. Resistor 91 now damps said oscillations.

It is evident that a similar embodiment as that in FIG. 12 is possible when the line deflection coil halves are parallel arranged. FIG. 13 shows part of a circuit arrangement wherein this is the case.

We claim:

1. A distortion correction circuit for line and field deflection coils of a display tube, said circuit comprising line and field deflection generator means coupled to said coils respestively for producing line and field deflection signals respectively; a modulator means for providing a line frequency first correction current having a field frequency varying amplitude to at least one of said coils; and means for supplying an additional correction current distinct from said deflection signals that is a thrid power function of at least one of said deflection signals and for applying it to said one deflection coil in the same direction as said first correction current.

2. A circuit as claimed in claim 1 wherein said supplying means comprises a non-linear inductor series coupled to said modulator and having an inductance that decreases with increasing current.

3. A circuit as claimed in claim 1 wherein said supplying means comprises a tuned circuit including an inductor and a capacitor parallel coupled thereto, said circuit being tuned to a frequency between the line frequency and twice the line frequency and being series coupled to said modulator.

4. A circuit as claimed in claim 3 wherein said inductor comprises a transformer primary, said transformer including a secondary; and further comprising means coupled to said secondary for correcting North-South pincushion distortion in said display tube.

5. A circuit as claimed in claim 1 wherein said modulator comprises diode switch means operating at the line frequency for coupling during the line scan time the field generator to a resonant circuit having a period twice the line flyback period, said resonant circuit including a capacitor and said line deflection coil; and further comprising a coil coupled in series between said line generator and said line coil.

6. A circuit as claimed in claim 5 further comprising a resistor series coupled to said capacitor.

7. A circuit as claimed in claim 5 further comprising a series circuit including in order a first capacitor, a pair of diodes that are non-conducting during the line flyback time, and a second capacitor, said series circuit being parallel coupled to said coil; and an inductance capacitance parallel resonant circuit coupled to the junction of the diodes, said circuit being resonant at a frequency between the line frequency and twice the line frequency.

8. A circuit as claimed in claim 1 further comprising amplifier means for applying said field signal to said modulator, said amplifier including a complementary pair of transistors adapted to receive a negative feedback network having an input coupled to the output electrodes of said transistors for receiving a zero average signal, said network comprising fixed and voltage dependent resistors coupled thereto.

9. A circuit as claimed in claim 1 further comprising a circuit coupled between said modulator and said field generator, said circuit comprising a fixed and a voltage dependent resistor parallel coupled thereto.

10. A circuit as claimed in claim 1 further comprising North-South pincushion correction means for adding a sinusoidal current of line frequency to said correction current.

11. A circuit as claimed 1 wherein said additional correction current is a third power function of both of said deflection signals.

* * * * *

PO-1050
(5/69)

UNITED STATES PATENT OFFICE
CERTIFICATE OF CORRECTION

Patent No. 3,748,531 Dated July 24, 1973

Inventor(s) ANTONIUS BOEKHORST ET AL

It is certified that error appears in the above-identified patent and that said Letters Patent are hereby corrected as shown below:

Claim 5, line 21, after "period" insert -- substantially equal to --;

Signed and sealed this 23rd day of April 1974.

(SEAL)
Attest:

EDWARD M.FLETCHER,JR.
Attesting Officer

C. MARSHALL DANN
Commissioner of Patents

PO-1050
(5/69)

UNITED STATES PATENT OFFICE

CERTIFICATE OF CORRECTION

Patent No. 3,748,531 Dated July 24, 1973

Inventor(s) ANTONIUS BOEKHORST ET AL

It is certified that error appears in the above-identified patent and that said Letters Patent are hereby corrected as shown below:

IN THE TITLE PAGE change "W.S. Philips Corporation" to -- U.S. Philips Corporation --;

Signed and sealed this 24th day of September 1974.

(SEAL)
Attest:

McCOY M. GIBSON JR.
Attesting Officer

C. MARSHALL DANN
Commissioner of Patents